(12) United States Patent
Harrison et al.

(10) Patent No.: US 8,019,489 B2
(45) Date of Patent: Sep. 13, 2011

(54) METHODS AND SYSTEMS FOR DISPLAYING MESSAGES FROM A PLURALITY OF SOURCES

(75) Inventors: Ben M. Harrison, Carnation, WA (US);
Robert J. Tenwinkel, Stanwood, WA (US); Drew W. Houck, Woodinville, WA (US)

(73) Assignee: The Boeing Company, Chicago, IL (US)

( * ) Notice: Subject to any disclaimer, the term of this patent is extended or adjusted under 35 U.S.C. 154(b) by 957 days.

(21) Appl. No.: 11/613,540

(22) Filed: Dec. 20, 2006

(65) Prior Publication Data

US 2008/0154441 A1    Jun. 26, 2008

(51) Int. Cl.
C01C 23/00    (2006.01)

(52) U.S. Cl. .............................. 701/3; 455/431; 244/75

(58) Field of Classification Search .......... 701/3, 14–16,
701/11, 120; 715/771; 342/29, 176, 25,
342/36; 340/945, 953, 954, 959–964; 455/431;
244/75, 99.9
See application file for complete search history.

(56) References Cited

U.S. PATENT DOCUMENTS

| | | | |
|---|---|---|---|
| 4,746,981 A * | 5/1988 | Nadan et al. | 348/581 |
| 4,951,229 A * | 8/1990 | DiNicola et al. | 345/533 |
| 6,571,155 B2 | 5/2003 | Carriker et al. | |
| 6,832,138 B1 | 12/2004 | Straub et al. | |
| 6,842,672 B1 | 1/2005 | Straub et al. | |
| 6,985,801 B1 | 1/2006 | Straub et al. | |
| 7,634,353 B2 * | 12/2009 | Meunier et al. | 701/120 |
| 7,739,047 B2 * | 6/2010 | Meunier et al. | 701/300 |
| 7,783,612 B2 * | 8/2010 | Houk et al. | 707/690 |
| 7,797,086 B2 * | 9/2010 | Lorido et al. | 701/16 |
| 7,809,405 B1 * | 10/2010 | Rand et al. | 455/563 |
| 7,835,825 B2 * | 11/2010 | Coulmeau et al. | 701/3 |
| 2002/0109625 A1 * | 8/2002 | Gouvary | 342/29 |
| 2005/0039177 A1 * | 2/2005 | Burke | 717/165 |
| 2005/0049762 A1 * | 3/2005 | Dwyer | 701/3 |
| 2005/0231390 A1 | 10/2005 | Crane et al. | |
| 2006/0069635 A1 * | 3/2006 | Ram et al. | 705/37 |
| 2006/0163430 A1 | 7/2006 | Cordina et al. | |
| 2006/0259232 A1 * | 11/2006 | Huthoefer et al. | 701/120 |
| 2007/0050101 A1 * | 3/2007 | Sacle et al. | 701/11 |
| 2008/0154441 A1 * | 6/2008 | Harrison et al. | 701/3 |
| 2008/0284618 A1 * | 11/2008 | Fabas et al. | 340/945 |
| 2010/0030400 A1 * | 2/2010 | Komer et al. | 701/3 |
| 2010/0030401 A1 * | 2/2010 | Rogers et al. | 701/3 |

FOREIGN PATENT DOCUMENTS

EP    1491444 A1    12/2004

(Continued)

OTHER PUBLICATIONS

T. L. Samuels, "Meteorological Conditions During the Formation of Ice on Aircraft" NACA TN No. 439, Dec. 1932. cited by other.*

(Continued)

Primary Examiner — Cuong H Nguyen
(74) Attorney, Agent, or Firm — Armstrong Teasdale LLP

(57) ABSTRACT

Methods and systems for a flight deck display system for displaying text messages are provided. The system includes an alert generator configured to receive message signals from a plurality of aircraft systems and to generate alert messages based on the received message signals, and a flight deck display screen that includes a screen portion that is separately controlled by the alert generator to display messages received from the alert generator.

20 Claims, 4 Drawing Sheets

FOREIGN PATENT DOCUMENTS

| EP | 1625454 A1 | * | 2/2006 |
|---|---|---|---|
| FR | 2854964 A1 | * | 11/2004 |
| WO | 0229362 A2 | | 4/2002 |
| WO | WO 2004102296 A1 | * | 11/2004 |
| WO | 2005050601 A2 | | 6/2005 |
| WO | WO 2007011963 A2 | * | 1/2007 |

OTHER PUBLICATIONS

W. D. Coles, "Experimental Determination of Thermal Conductivity of Low Density Ice", NACA Technical Note 3143, Mar. 1954. cited by other.*

P. Jarvinen, "Aircraft Ice Detection Method" AIAA Paper 2007-0689, Proceedings of the 45th Aerospace Sciences Meeting and Exhibit, Jan. 8-11, 2007, Reno, NV. cited by other.*

Impact of traffic symbol directional cues on pilot performance during TCAS events; Olson, W. et al.; Digital Avionics Systems Conference, 2009. DASC '09. IEEE/AIAA 28th;Digital Object Identifier: 10.1109/DASC.2009.5347460 Publication Year: 2009, pp. 5.D.2-1-5.D.2-10.*

Real time runway incursion cockpit advisory; Hal, D.; Surace, L.; Digital Avionics Systems Conference, 2007. DASC '07. IEEE/AIAA 26th; Digital Object Identifier: 10.1109/DASC.2007.4391926; Publication Year: 2007, pp. 5.A.2-1-5.A.2-9.*

UAS Safety: Unmanned Aerial Collision Avoidance System (UCAS); Asmat, J.; Rhodes, B.; Umansky, J.; Villavicencio, C.; Yunas, A.; Donohue, G.; Lacher, A.; Systems and Information Engineering Design Symposium, 2006 IEEE; Digital Object Identifier: 10.1109/SIEDS.2006.278711; Publication Year: 2006, pp. 43-49.*

Flight testing of a prototype Cockpit Display of Traffic Information for approach spacing applications; Garloch, J.L.; Digital Avionics Systems, 2001. DASC. The 20th Conference; vol. 1; Digital Object Identifier: 10.1109/DASC.2001.963387 Publication Year: 2001, pp. 5A4/1-5A4/7 vol. 1.*

Automatic alert code and test generation system; Taylor, S.; Janelle, J.; Digital Avionics Systems Conference, 1990. Proceedings., IEEE/AIAA/NASA 9th; Digital Object Identifier: 10.1109/DASC.1990.111270; Publication Year: 1990, pp. 101-106.*

Issues in airborne systems for closely-spaced parallel runway operations; Pritchett, A.; Carpenter, B.; Asari, K.; Kuchar, J.; Hansman, R.J.; Digital Avionics Systems Conference, 1995., 14th DASC; Digital Object Identifier: 10.1109/DASC.1995.482820 Publication Year: 1995, pp. 140-145.*

Flight test measurement of pilot reaction times to runway incursions: out-the-window vs. synthetic vision; Jennings, C.W.; Powell, J.D.; Digital Avionics Systems Conference, 2002. Proceedings. The $21^{st}$; vol. 2 , Digital Object Identifier: 10.1109/DASC.2002.1052975; Publication Year: 2002, pp. 11B5-1-11B5-9 vol. 2.*

Long duration impulse withstand capability of SPD; Zhang Nanfa; Kang Guoyao; Guo Yaping; Electromagnetic Compatibility (APEMC), 2010 Asia-Pacific Symposium on; Digital Object Identifier: 10.1109/APEMC.2010.5475770; Publication Year: 2010, pp. 1510-1513.*

Effects of traffic display size and location on visual separation during visual approaches: Cockpit Display of Traffic Information (CDTI) Enhanced Flight Rules (CEFR); Bone, R.S. et al.; Digital Avionics Systems Conf, 2003. DASC '03. The 22nd; vol. 2; Digital Object Identifier: 10.1109/DASC.2003.1245907; Pub. Year: 2003, pp. 9.B.2-91-12 vol. 2.*

Development of a complete UAV system using COTS equipment; Rangel, R.K.; Kienitz, K.H.; Brandao, M.P.; Aerospace conference, 2009 IEEE; Digital Object Identifier: 10.1109/AERO.2009.4839603; Publication Year: 2009, pp. 1-11.*

Advanced flight deck for next generation aircraft; Faerber, R.A.; Etherington, T.J.; Digital Avionics Systems Conference, 1998. Proceedings., 17th DASC. The AIAA/IEEE/SAE; vol. 1; Digital Object Identifier: 10.1109/DASC.1998.741578 Publication Year: 1998, pp. E42/1-E42/8 vol. 1.*

UK Search Report for GB0724641.6; Apr. 17, 2008; 4 pages.

* cited by examiner

METHODS AND SYSTEMS FOR DISPLAYING MESSAGES FROM A PLURALITY OF SOURCES

BACKGROUND OF THE INVENTION

This invention relates generally to aircraft cockpit displays and more particularly, to methods and systems for displaying messages from a plurality of different sources on aircraft cockpit displays.

At least some known aircraft include cockpit displays. Since the introduction of the 767 in the early 1980s, modern transport category airplanes, and more recently private business airplanes, typically have three types of display panels in the flight deck, a Primary Flight Display (PFD) that Provides attitude, altitude, speed and other flight path information in text and graphic format, a Navigation Display (ND) that provides graphical display of the aircraft's airspace, terrain and weather environment, with the desired and actual flight path, and an Engine Indication and Crew Alerting System (EICAS) that provides the status of airplane systems in graphic and text format, and provides crew messages to annunciate non-normal conditions.

Such displays are generally developed to meet airplane manufacturer specification requirements. Each display is driven by a software package which generates all the graphic images including alpha-numeric characters. This software is typically proprietary to the display supplier, and is created and owned by the supplier. During development and certification, and throughout the life of the airplane, any changes to the display software can only be made by the supplier. Because of the system architecture, even a minor change to the display, such as adding a text message, requires extensive testing of the software, flight testing and recertification by a regulatory body such as the Federal Aviation Administration (FAA). Such testing and recertification can cost several hundred thousand dollars, and can require many months to complete.

As the modern flight deck evolves, new features are proposed that improve flight safety and/or enhance the efficiency of flight operations. These features often involve new messages that must be displayed on EICAS, PFD, or ND. Because the cost and schedule impact of changes is prohibitive, new features which are recommended for incorporation into the flight deck displays must typically wait until some new derivative model of the airplane is being developed which requires changes to the display software. In many cases desirable features are never incorporated because of cost and schedule considerations. A major factor in the prohibitive costs and schedules associated with these changes is that the software and associated hardware that drives these displays is owned and controlled by the display suppliers, not by the airplane manufacturer.

BRIEF DESCRIPTION OF THE INVENTION

In one embodiment, a flight deck display system for displaying text messages includes an alert generator configured to receive message signals from a plurality of aircraft systems and to generate alert messages based on the received message signals, and a flight deck display screen that includes a screen portion that is separately controlled by the alert generator to display messages received from the alert generator.

In another embodiment, a display system for an aircraft includes an alert generator configured to receive message signals from a plurality of aircraft systems and to generate alert messages based on the received message signals, a flight deck display screen that includes a screen portion that is separately controlled by the alert generator to display messages received from the alert generator, and a qualified software tool embodied on a separate computer communicatively couplable to the alert generator, the qualified software tool configured to modify logic in the alert generator.

In yet another embodiment, a method of displaying messages on a flight deck display that includes a screen having a first portion controlled by the flight deck display and a second reserved portion controlled by a source external to the flight deck display is provided. The method includes receiving at least one input of a measured quantity from a plurality of airplane components and subsystems, generating an alert signal using an alert generator based on the at least one input and a predetermined logic rule wherein the alert generator includes logic partitioned from a central computing function of the airplane. The method also includes generating at least one text message based on the generated alert signal, and transmitting the generated text message to the second portion of the flight deck display screen.

DETAILED DESCRIPTION OF THE INVENTION

Figure 1:
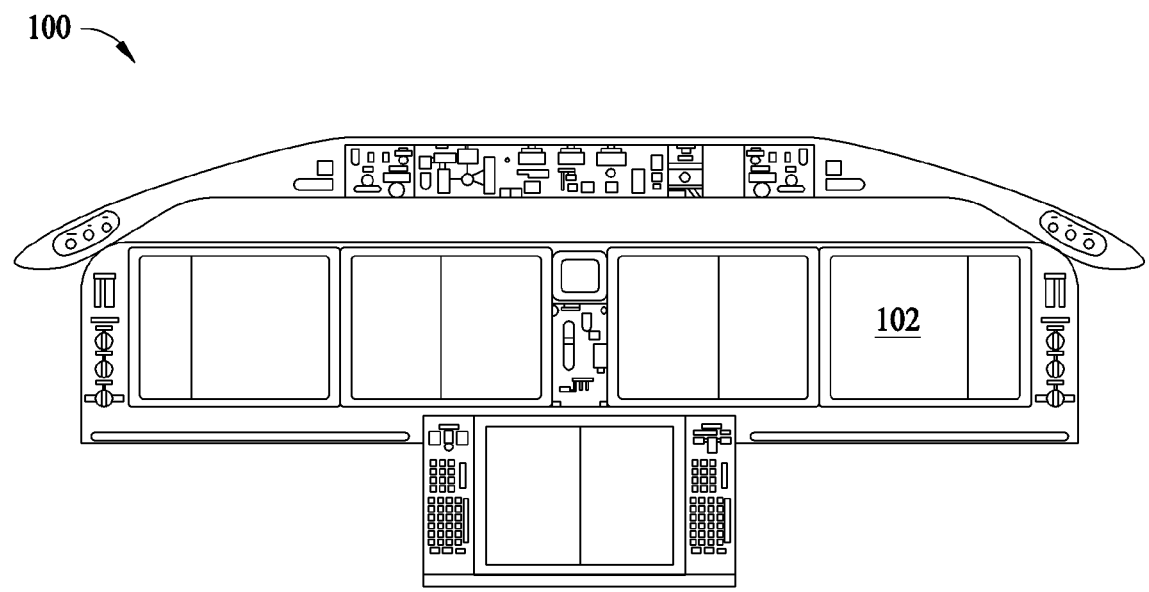
FIG. 1 is a forward perspective view of an exemplary aircraft cockpit display panel that includes at least one display screen in accordance with an embodiment of the present invention.

FIG. 1 is a forward perspective view of an exemplary aircraft cockpit display panel 100 that includes at least one display screen 102 in accordance with an embodiment of the present invention. In the exemplary embodiment, display screen is positioned on aircraft cockpit display panel 100. In an alternative embodiment, display screen 102 is positioned on an auxiliary panel (not shown) located in the cockpit of the aircraft. During aircraft operation, display screen 102 is available for viewing by a pilot and/or co-pilot of the aircraft.

Figure 2:
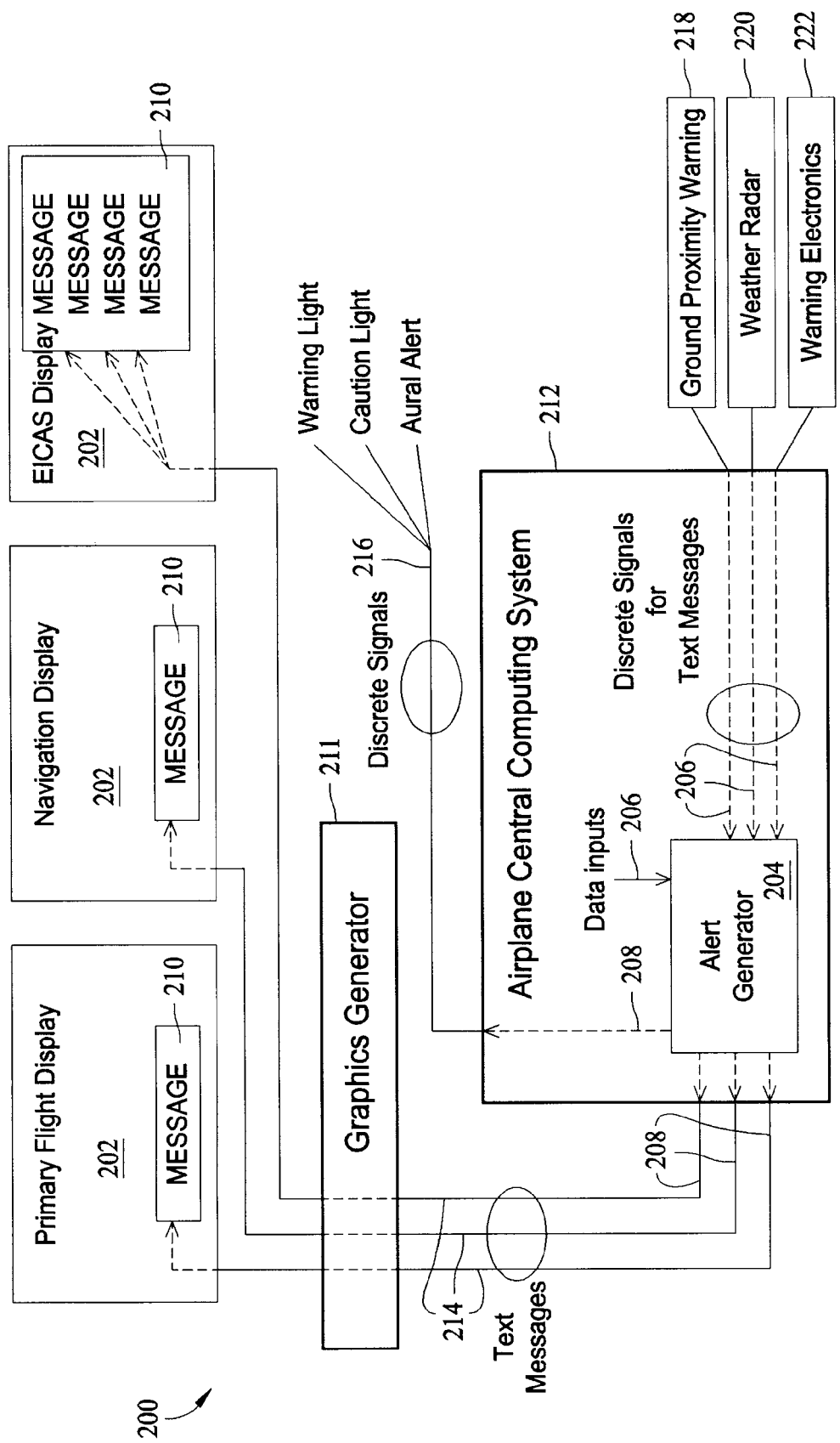
FIG. 2 is schematic block diagram of a flight deck display system for displaying text messages on a flight deck display screen.

FIG. 2 is schematic block diagram of a flight deck display system 200 for displaying text messages on a flight deck display screen 202. For example, flight deck display screen 202 may comprise one or more flight deck displays. Known display systems include software and associated hardware that drives the display systems that is resident within each display system and which is owned and controlled by the display suppliers, not by the airplane manufacturer. In various embodiments of the present invention substantially all text messages displayed on the main flight deck displays are generated by a common block of software controlled by the airplane manufacturer. Each flight deck display screen 202 in the flight deck includes display software to control images, graphics, and text displayed on flight deck display screen 202. The software is configured such that a reserved portion 210 of flight deck display screen 202 space is reserved for text messages. The display software does not control reserved portion 210 of flight deck display screen 202. The display software is partitioned such that only text messages generated by an external source such as alert generator 204 are displayed in reserved portion 210. For the display software, this is a "passthrough function". Flight deck display system 200 includes an alert generator 204 configured to receive message signals 206 from a plurality of aircraft systems (not shown) and generate alert messages 208. Alert generator 204 is communicatively coupled to reserved screen portion 210 of flight deck display screen 202. In an alternative embodiment, reserved screen portion 210 is separately controlled by a graphics generator 211 to display messages received from alert generator 204 and is not controlled by the respective display software.

In the exemplary embodiment, alert generator 204 comprises a separate partitioned block of software in a central computing function 212 of the aircraft. In an alternative embodiment, alert generator 204 comprises a dedicated hardware module (not shown). In the exemplary embodiment, central computing function 212 includes a computing platform running a partitioned operating environment compliant with for example, ARINC 653 and including an Avionics Full Duplex Switched Ethernet (AFDX) network backbone. In other various embodiments, other network configurations are used. Also in the exemplary embodiment, central computing function 212 provides shared system platform resources to host airplane functional systems such as avionics, environmental control, electrical, mechanical, hydraulic, auxiliary power unit, cabin services, flight controls, health management, fuel, payloads, and propulsion.

Central computing function 212 is typically configured to utilize Remote Data Concentrators (RDC) (not shown) to consolidate inputs from aircraft systems and aircraft sensors which includes analog and digital interfaces, such as ARINC 429 and Controller Area Network (CAN) bus. The RDC then provides that information to the central computing function 212 via the AFDX network.

Alert generator 204 also comprises on-board loadable software that is configured to generate text messages 214 and transmit text messages 214 to an appropriate display 202. Alert generator 204 is also configured to generate discrete signals 216 to trigger aural alerts including voices, and activate lights such as caution and warning lights in the flight deck. Because of redundancy requirements, some alerts are generated by sources external to alert generator 204, such as a ground proximity system 218, weather radar 220, and/or a Traffic Collision Avoidance Systems (TCAS) 222. Such sources independently activate lights and aural alerts, including voices and also transmit discrete signals to alert generator 204 to trigger text messages 214.

In the exemplary embodiment, alert generator 204 is partitioned from a remainder of central computing function 212 such that modification of a software code segment comprising alert generator 204 to modify existing alerts or generate new alerts is accomplished entirely within alert generator 204 software, including all testing and certification, without affecting any other functions within display system 200, and thus requiring no retesting or recertification of display system 200 software, which creates and manages other graphics displayed on display screen 202. Some new alerts may require new sensors and/or new wiring to generate the signal input 206 to alert generator 204. Various embodiments of the present invention differ from known display systems in that substantially all text messages displayed on the main flight deck displays are generated by a common block of software.

This proposed architecture could be applied to existing systems, but is greatly facilitated by the use of a common protocol for all the displays. A new standard protocol, ARINC 661, is used for all the displays, regardless of the supplier. This means that the alert generator 204 software can create a text message and send to reserved portion 210 of any of the flight deck display screens, where it can be displayed without reformatting or other modification.

Alert generator 204 is also configured to prioritize all text messages. For example, the space reserved for text messages one or more flight deck displays may allow only one text message to be displayed at any given time. A list of messages may be displayed on one or more flight deck displays, and are prioritized to determine the order in which they are listed.

Because alert generator 204 is partitioned from the software controlling the display software, alert generator 204 can be created, owned, controlled and certified by the airplane manufacturer or other entity, not necessarily the display supplier.

Figure 3:
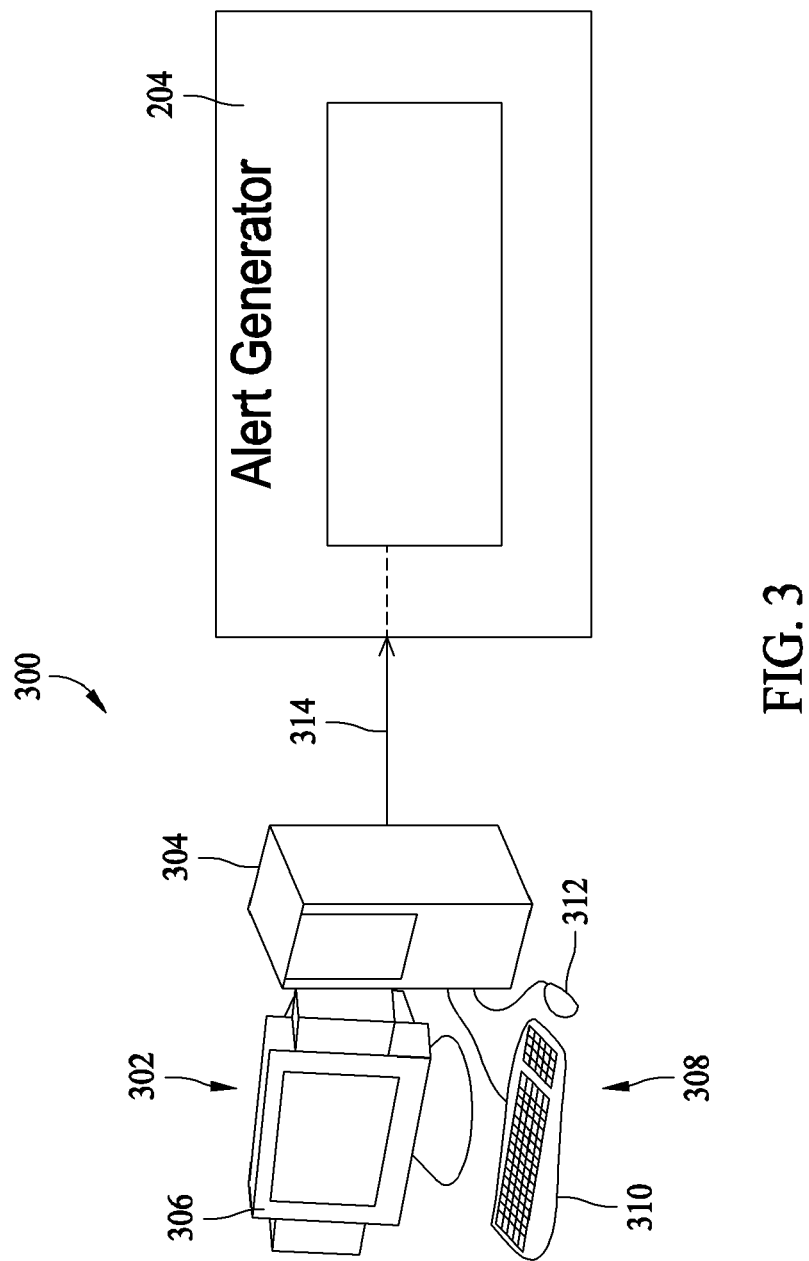
FIG. 3 is schematic data flow block diagram of an alert generator control system (AGCS) 300.

FIG. 3 is schematic data flow block diagram of an alert generator control system (AGCS) 300 illustrating the use of a qualified software tool to create or modify the alert generator software.

AGCS 300 includes a computer 302 that is based on a desktop computing application including, in the exemplary embodiment, a processor 304, a display 306, at least one user input device 308 such as a keyboard 310 and/or a mouse 312. As used herein, the term computer is not limited to just those integrated circuits referred to in the art as a computer, but broadly refers to a processor, a microcontroller, a microcomputer, a programmable logic controller (PLC), an application specific integrated circuit, and other programmable circuits. In the exemplary embodiment, processor 304 includes a memory (not shown) that includes for example, but is not limited to, a computer-readable medium, such as a random access memory (RAM). Alternatively, a floppy disk, a compact disc-read only memory (CD-ROM), a magneto-optical disk (MOD), and/or a digital versatile disc (DVD) may also be used. Also, in the exemplary embodiment, additional user input devices 308 include, for example, but not be limited to, a scanner. AGCS 300 is configured to communicatively couple to alert generator 204 through a link 314. AGCS 300 includes a qualified software tool comprising a software code segment embodied on the computer readable medium. The software tool is programmed to connect to alert generator 204 using for example, a standard protocol such as ARINC 161.

During operation, the software tool prompts a user, such as an aircraft manufacturer engineer to select logic for controlling flight deck alerts or software for generating text messages that are resident in alert generator 204. Creating or modifying new alerts and text messages within alert generator 204 is facilitated using the qualified software tool. Alerts created using the software tool require a minimum of testing to achieve certification due primarily to the partition of the alert generator 204 software from the airplane central computing function and the partition of the display software from the reserved text message portion 210. Such a method also permits the aircraft manufacturer to create and change the alerting with minimal dependency on external suppliers such as the display supplier.

Figure 4:
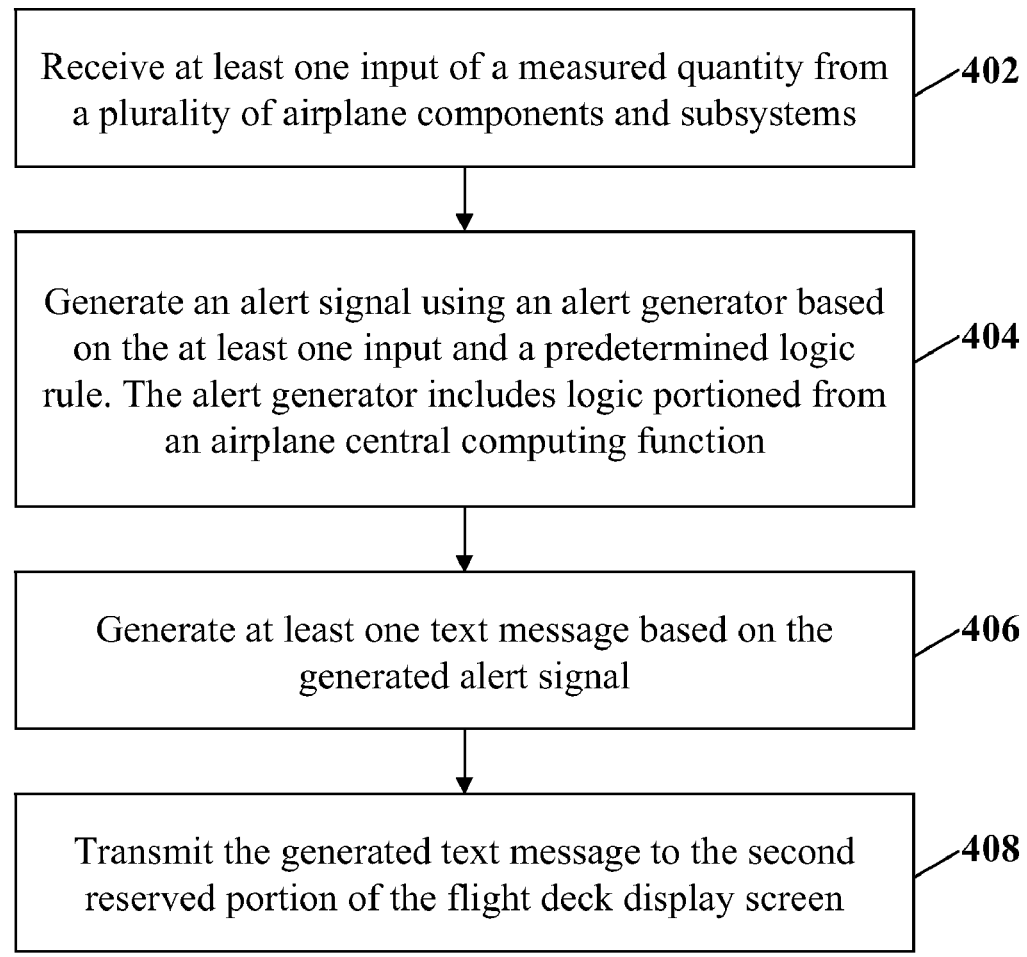
FIG 4. is a flowchart illustrating a method of displaying messages on a flight deck display.

The method is further illustrated by FIG. 4, which is a flowchart 400 of a method of displaying messages on a flight deck display that includes a screen having a first portion controlled by the flight deck display and a second reserved portion of the screen controlled by a source external to the flight deck display. The method includes receiving 402 at least one input of a measured quantity from a plurality of airplane components and subsystems, generating 404 an alert signal using an alert generator, embedded in a memory and executed on a processing device, based on the at least one input and a predetermined logic rule, the alert generator including logic portioned from an airplane central computing function, generating 406 at least one text message based on the generated alert signal, and transmitting 408 the generated text message to the second reserved portion of the flight deck display screen.

The logic for substantially all the alerts resides in alert generator 204, which is a partitioned block of software within the central computing function of the airplane and is on-board loadable. The software of alert generator 204 is generated by a qualified software tool. The alert generator 204 software generated or modified by this qualified tool can then be certified by the Federal Aviation Administration (FAA) with a minimum of testing because of the partition. This software tool is based on a PC or other desktop hardware, and is owned and used by the airplane manufacturer or other entity, not necessarily by the display supplier.

With each new generation of airplane, more and more data is becoming available within the central computing functions of the airplane. There some specific situations in which a new alert requires changes to various system components to produce the required signals, and new wiring or wireless hardware to transmit the signals. However, for a substantial proportion of the situations, new alerts are created entirely within the alert generator software described herein, based on data available within the central computing function. In these situations, the airplanes are updated by onboard downloading of the revised alert generator software.

The above-described methods and systems for displaying messages and alerts for an aircraft are cost-effective and highly reliable. The methods described herein simplify and significantly reduce the cost of creating and incorporating text messages into one or more flight deck displays, and other displays that may be utilized in the future. Substantially all text messages displayed on the main flight deck displays are generated by a common block of software that is controlled by the airplane manufacturer rather than the display supplier. Accordingly, aircraft manufacturer engineers are then able to generate or modify text messages to be displayed on the flight deck displays. Use of the described architecture facilitates reducing the cost of development for new derivative models, and permits flexibility in making changes much later in the airplane design, testing and certification process. The methods and systems facilitate operation of the airplane in a cost-effective and reliable manner.

While the invention has been described in terms of various specific embodiments, those skilled in the art will recognize that the invention can be practiced with modification within the spirit and scope of the claims.

What is claimed is:

1. A flight deck display system for displaying text messages comprising:
   an alert generator embedded in a memory and executed on a processing device, said alert generator configured to receive message signals from a plurality of aircraft systems and to generate alert messages based on the received message signals; and
   a flight deck display screen comprising a first screen portion that is controlled by software associated with said display system and a second screen portion that is separately controlled by said alert generator to display messages received from said alert generator.

2. A system in accordance with claim 1 wherein said flight deck display screen forms a part of one or more flight deck displays.

3. A system in accordance with claim 1 wherein said alert generator includes logic rules, said alert generator configured to:
   receive data inputs relating to the operation of airplane components and subsystems from airplane subsystems; and
   generate message signals based on the received data inputs and the logic rules.

4. A system in accordance with claim 1 wherein said alert generator is configured to generate discrete alert signals to activate at least one of caution lights, warning lights, and aural messages based on the received data inputs and the logic rules.

5. A system in accordance with claim 1 wherein said alert generator is configured to generate textually formatted messages based on the received data inputs and the logic rules.

6. A system in accordance with claim 1 wherein said alert generator is communicatively coupled to said screen portion and other aircraft systems through a graphics generator configured to:
   receive text message signals from said alert generator; and
   generate graphics to cause text messages to be displayed on said screen portion.

7. A system in accordance with claim 6 wherein said graphics generator is configured to generate graphics to be displayed on one or more flight deck displays.

8. A system in accordance with claim 1 wherein said alert generator comprises at least one of a software code segment and a hardware module that is partitioned from a remainder of a central computing function of the aircraft.

9. A display system for an aircraft comprising:
   an alert generator embedded in a memory and executed on a processing device, said alert generator configured to receive message signals from a plurality of aircraft systems and to generate alert messages based on the received message signals;
   a flight deck display screen comprising a first screen portion that is controlled by software associated with said display system and a second screen portion that is separately controlled by said alert generator to display messages received from said alert generator; and
   a software tool embodied on a separate computer communicatively couplable to said alert generator, said software tool configured to modify logic in said alert generator.

10. A system in accordance with claim 9 wherein said flight deck display screen forms a part of one or more flight deck displays.

11. A system in accordance with claim 9 wherein said alert generator includes logic rules, said software tool configured to:
   receive a logic rule selection from user; and
   associate a data input relating to the operation of airplane components and subsystems received by said alert generator with message signals to be displayed on said flight deck display screen based on a user input and the selected logic rule.

12. A system in accordance with claim 9 wherein said alert generator is configured to generate discrete alert signals to activate at least one of caution lights, warning lights, and aural messages based on the received data inputs and the logic rules.

13. A system in accordance with claim 9 wherein said alert generator is configured to generate textually formatted messages based on the received data inputs and the logic rules.

14. A system in accordance with claim 9 wherein said alert generator is communicatively coupled to said screen portion and other aircraft systems through a graphics generator configured to:
   receive text message signals from said alert generator; and generate graphics to cause the messages to be displayed on said screen portion.

15. A system in accordance with claim 14 wherein said graphics generator is configured to generate graphics to be displayed on one or more flight deck displays.

16. A system in accordance with claim 9 wherein said alert generator comprises at least one of a software code segment and a hardware module that is partitioned from a remainder of a central computing function of the aircraft.

17. A method of displaying messages on a flight deck display that includes a screen having a first portion controlled by the flight deck display and a second reserved portion of the screen controlled by a source external to the flight deck display, said method comprising:
   receiving at least one input of a measured quantity from a plurality of airplane components and subsystems;
   generating an alert signal using an alert generator, embedded in a memory and executed on a processing device, based on the at least one input and a predetermined logic rule, the alert generator including logic portioned from an airplane central computing function;
   generating at least one text message based on the generated alert signal; and
   transmitting the generated text message for display within the second reserved portion of the flight deck display screen.

18. A method in accordance with claim 17 further comprising determining a priority order of the at least one generated text message.

19. A method in accordance with claim 17 further comprising communicatively coupling the alert generator to a computer that includes a software tool embodied on a computer readable medium, the software tool programmed to receive inputs from a user to modify the predetermined logic rule such that a text message is generated based on the at least one input of a measured quantity and the modified logic rule.

20. A method in accordance with claim 17 further comprising qualifying the software tool by a regulatory body such that software modifications in the alert generator made using the software tool are certifiable by the regulatory body using less testing than software modifications in the alert generator made without using the software tool.

\* \* \* \* \*